United States Patent [19]

Oman

[11] 3,750,155
[45] July 31, 1973

[54] TEMPERATURE MONITORING CIRCUIT

[75] Inventor: Gary F. Oman, Greendale, Wis.

[73] Assignee: Johnson Service Company, Milwakee, Wis.

[22] Filed: Aug. 3, 1971

[21] Appl. No.: 168,669

[52] U.S. Cl. ...... 340/183, 73/362 AR, 340/177 CA, 340/228, 328/104
[51] Int. Cl. ........................................... G08c 15/06
[58] Field of Search .................... 340/183, 177 CA, 340/228; 307/310; 328/3, 104; 73/362 AR; 323/75 N; 330/69

[56] References Cited
UNITED STATES PATENTS

| | | | |
|---|---|---|---|
| 3,248,654 | 4/1966 | Shiragaki | 328/3 |
| 3,613,454 | 10/1971 | McFadin | 73/362 AR |
| 3,379,973 | 4/1968 | Walton | 73/362 AR |
| 3,626,398 | 12/1971 | Owens, Jr. | 340/183 |
| 3,651,696 | 7/1969 | Rose | 73/362 AR |
| 2,753,547 | 7/1956 | Donath et al. | 340/177 cA |
| 3,613,060 | 10/1971 | Legrand | 340/183 |

OTHER PUBLICATIONS
"Applications Manual for Operational Amplifiers" (2nd Ed.) Philbrick/Nexus Research, Teledyne Co. p. 64

*Primary Examiner*—John W. Caldwell
*Assistant Examiner*—Robert J. Mooney
*Attorney*—John A. Dienner, Arthur J. Wagner et al.

[57] ABSTRACT

A data acquisition system including a plurality of temperature monitoring circuits, each including an operational amplifier having a resistance-type temperature sensing element connected in a feedback loop of the amplifier and operable to provide an output voltage that is a function of the temperature measured by the circuit, a reference source which supplies a reference voltage to the amplifiers, enabling each amplifier to provide a constant current to the sensing element, a reference source monitoring circuit operable to provide an output voltage proportional to the reference voltage, and a multiplexing circuit for selectively extending the output voltages provided by the temperature monitoring circuits and the reference source monitoring circuit to a central processor. The output voltage provided by the reference source monitoring circuit is processed at the central processor to permit adjustment of the output voltages extended to the central processor from the temperature monitoring circuits to compensate for changes in the amplitude of the reference voltage.

3 Claims, 3 Drawing Figures

PATENTED JUL 31 1973  3,750,155

INVENTOR
GARY F. OMAN

BY Johnson, Dienner Emrich
Verlich-Wagner ATTYS.

TEMPERATURE MONITORING CIRCUIT

BACKGROUND OF THE INVENTION

1. Field of the invention

This invention relates to temperature monitoring circuits which include resistance-type temperature sensors, and more particularly, to a temperature monitoring circuit including a temperature responsive element connected in a feed-back loop of an operational amplifier for monitoring temperatures over a wide range.

2. Description of the prior art

Automatic remote temperature sensing with resistance-type sensors is usually accomplished using passive bridge networks to provide linearization of the nonlinear characteristics of the resistance-type sensing element used. Although a given temperature sensing element of such a bridge network may be responsive to temperature changes over a wide range, the other circuit elements which comprise the bridge network limit the range over which the bridge network provides a linear output. Thus, different networks must be provided to monitor temperatures over a wide range. Moreover, the output level of bridge circuits is low, and thus, temperature monitoring circuits which employ bridge networks are characterized by a low signal-to-noise ratio.

Other temperature monitoring circuits employing active components have been provided which measure temperature but do not compensate for the nonlinearity of the resistance characteristic of the sensing element. These circuits are capable of measuring temperatures over substantially the entire dynamic range of a given sensing element. One such temperature sensing circuit, described in NASA TECH Brief 70-10303, dated December 1970, includes an operational amplifier having a resistance thermometer element connected in a feed-back loop of the operational amplifier. A second operational amplifier has differential inputs connected across the resistance thermometer and provides an output voltage that is proportional to the voltage variation of the temperature sensor caused by changes in temperature.

In this arrangement, the output voltage provided by the circuit is a function of the differential input of the second amplifier and thus, the circuit must be balanced to provide proper operation. Moreover, two operational amplifiers are required which add to the complexity of the circuit and increases the cost of the circuit. In addition, the second amplifier introduces errors, such as drift with ambient temperature change and gain variations which affect the accuracy of the temperature measuring circuit.

SUMMARY OF THE INVENTION

The present invention provides an active wide-range temperature monitoring circuit which can be used with any resistance-type temperature sensor for providing an output signal that is representative of temperature measured by the circuit. Linearization of the output signal to compensate for the non-linear resistance characteristic of the sensing element is effected by a separate linearizing circuit, and accordingly, the temperature monitoring circuit of the present invention is operable over the entire resistance range of a given temperature sensing element.

The temperature monitoring circuit requires only one operational amplifier to provide an output that represents the temperature measured by the circuit, and consequently, errors due to drift with ambient temperature change and amplifier gain variations are minimized. In addition, the circuit does not employ differential sensing to obtain an output that is representative of temperature. Therefore, circuit balance is not critical to proper operation of the circuit.

Moreover, the low cost operational amplifier used permits high level transmission, thus improving the signal-to-noise ratio over that provided by temperature measuring circuits which employ bridge networks.

In one embodiment of the invention, the temperature monitoring circuit includes an operational amplifier having a resistance-type temperature sensing element, which varies as a function of temperature, connected in a feed-back loop of the amplifier. The amplifier which is connected in a noninverting configuration has an input resistance connected to a reference source which supplies a constant reference voltage to the amplifier input resistance such that a constant current flows through the temperature sensing element. The voltage provided at the output of the amplifier is proportional to the ratio of the resistance of the sensing element to the amplifier input resistance in series with the reference source and is accordingly, a function of temperature. Thus, the temperature monitoring circuit provided by the present invention requires only one amplifier to provide an output voltage which is a direct representation of the temperature measured by the circuit.

In accordance with a further described embodiment of the invention, the voltage outputs of a plurality of temperature monitoring circuits are transmitted to a central processor which effects readout of the output voltages provided by each of the temperature monitoring circuits. The central processor includes linearizing means for linearizing the temperature-resistance characteristics of the sensing elements associated with the monitoring circuits.

In addition to the temperature sensing circuts, a reference circuit is provided for monitoring the voltage provided by the reference source which supplies current to the temperature monitoring circuits. The reference source monitoring circuit provides an output representing the actual amplitude of the source voltage which output is transmitted to the central processor. The linearizing means provides a ratio of the actual output value to the correct output value for the output of the reference source, and the outputs of all of the temperature monitoring circuits sharing their reference source are multiplied by the inverse of this ratio to correct for any change in the reference. Consequently, since the reference voltage is continuously monitored and changes in the reference voltage are compensated for, the need for a highly accurate reference source is eliminated.

Other advantages of the invention will be apparent from the following detailed description of the preferred embodiments as illustrated in the accompanying drawings.

DESCRIPTION OF PREFERRED EMBODIMENTS

Figure 1:
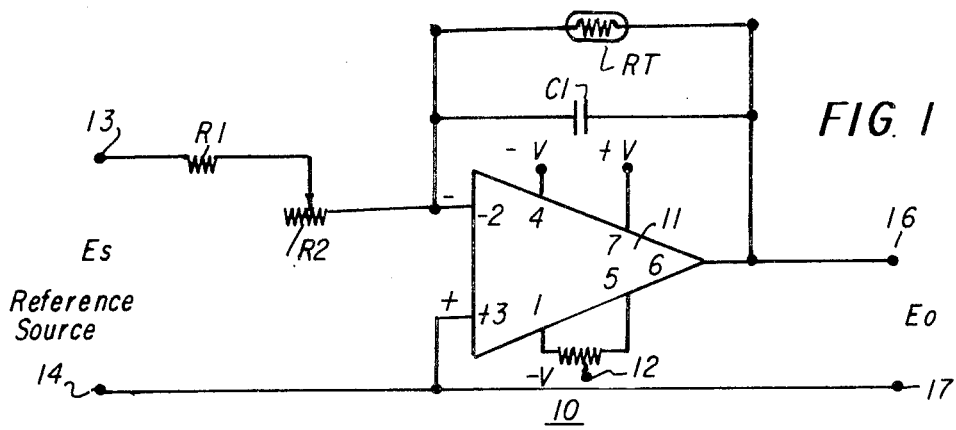
FIG. 1 is a schematic representation of a temperature monitoring circuit provided by the present invention.

Referring to FIG. 1, the temperature in monitoring circuit 10 comprises an operational amplifier 11 connected in a non-inverting configuration having an inverting input terminal 2 connected through an amplifier input resistance RI to a reference terminal 13 of a reference source Es and a non-inverting input terminal 3 connected to a common terminal 14 of the reference source Es. One commercially available operational amplifier suitable for this application is the model LM741C which is manufactured by National Semi-Conductor Inc. of Santa Clara, California. The reference source Es for the exemplary embodiment is negative 15 volts.

The amplifier input resistance RI may comprise the series connection of a fixed resistor R1 of 4.32 K ohms, and a variable resistor R2 of 500 ohms for trimming purposes. These resistors are commercially available from Texas Instruments, Inc. of Dallas, Texas and Beckman Instruments, Inc. of Fullerton, California, respectively.

Power is supplied to the amplifier 11 from a negative 15 volt voltage source −V to a terminal 4 of the amplifier 11 and from a positive 15 volt voltage source +V to a terminal 7 of the amplifier 11. A balance potentiometer RB for the amplifier 11 is connected between amplifier terminals 1 and 5 and has a tap 12 connected to the negative voltage source −V.

A resistance-type temperature sensing element RT is connected between inverting input terminal 2 of the operational amplifier 11 and an output terminal 6 of the amplifier 11 providing a feed-back loop for the amplifier 11.

The temperature sensing element RT may comprise, for example, a nickel wire element having a resistance of 1,000 ohms at 70° F. Such nickel wire elements may be the type having the catalog No. TE-1810-O-U-O, commercially available from Johnson Service Inc. of Milwaukee, Wisconsin. The nickel wire sensing element RT has a resistance characteristic that varies with temperature in accordance with the resistance versus temperature characteristic shown in FIG. 2. As can be seen from the resistance characteristic given in FIG. 2, the resistance of the sensing element RT varies nonlinearly with temperature over a temperature range of −100° F to 500° F. It is pointed out that other resistance-type temperature sensing elements, such as a thermistor could also be used. However, the selection of the reference source, and the determination of values required for the amplifier input resistance RI which is connected in series with the reference source Es, and the voltage output provided by the reference source ES, is based upon the resistance characteristic of the element used.

Referring again to FIG. 1, a capacitor C1 is connected between the inverting input terminal 2 of the amplifier 11 and the amplifier output terminal 6, in parallel with the sensing element RT, to lower the band width of the amplifier 11. The amplifier output terminal 6 is connected to an output terminal 16 of the temperature monitoring circuit 10 and a further output terminal 17 of the monitoring circuit is connected to the non-inverting input 3 of the amplifier 11.

As has been indicated above, the amplifier 11 is connected in a non-inverting configuration and the reference source Es supplies a constant reference voltage to the amplifier input resistor RI so that a constant current flows in the temperature sensing resistance element RT. It can be shown that ideally the operational amplifier 11 does not conduct current from the source Es, and accordingly, the current provided by the reference source Es is conducted to the resistance element RT. Ideally, this current is $$I = Es/RI \qquad (1)$$

Correspondingly, the output voltage Eo provided between output terminals 16 and 17 of the temperature monitoring circuit 10 is:

$$Eo = Es\ (RT/RI) \qquad (2)$$

Figure 2:
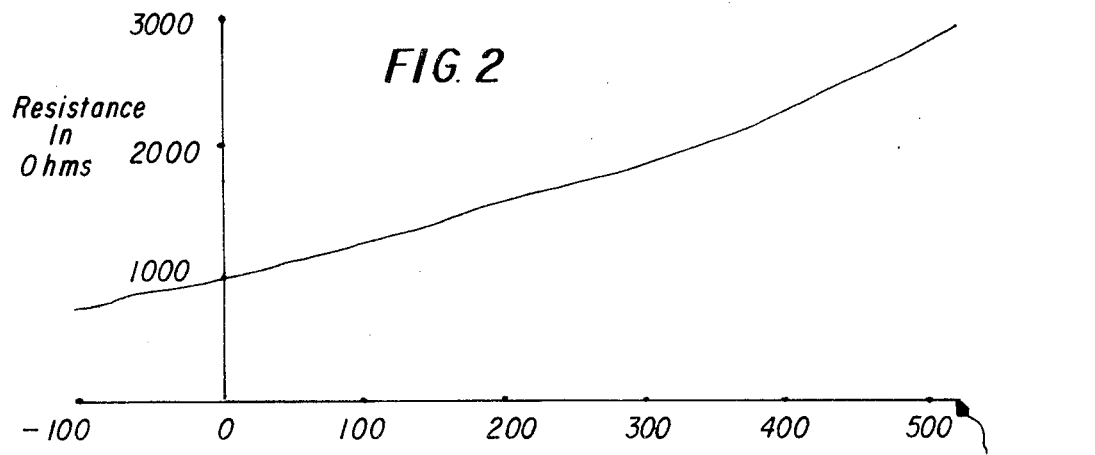
FIG. 2 is a resistance versus temperature characteristic for a resistance sensor employed in the circuit shown in FIG. 1.

Thus, as the temperature at the location of the temperature monitoring circuit 10 varies, the resistance of element RT will vary in accordance with the resistance characteristic for the sensing element RT shown in FIG. 2. Consequently, the circuit output voltage Eo, defined by equation (2), will also vary as a function of the resistance of sensing element RT and correspondingly the temperature measurement indicated by the circuit 10.

In one application, the temperature monitoring circuit 10 provided by the present invention is used to monitor ambient temperatures in a data acquisition system to provide an output voltage Eo which is a function of the ambient temperature at the location of the temperature sensing circuit 10 for transmission to a central monitoring point.

In a data acquisition system, a plurality of temperature monitoring circuits of the type shown in FIG. 1 may be used to automatically monitor the ambient temperature at a plurality of different locations in the system. In the embodiment illustrated in FIG. 3, three such temperature monitoring circuits 21–23 are provided at different locations in the system for measuring the ambient temperature at such positions and transmitting temperature information to a central processor 35.

Each temperature monitoring and transmitting circuit, such as circuit 21, includes an operational amplifier, such as amplifier 18 for circuit 21, and a resistance-type temperature sensing element, such as element 1RT for circuit 21, connected in a feedback loop of the associated amplifier 18. The operational amplifier 18 has an inverting input terminal 24 connected over an input resistance IRI to a reference terminal 13 of a common reference source Es, and a non-inverting input terminal 27 connected to a common terminal 14 of the reference source Es.

Similarly, temperature monitoring circuits 22 and 23 include operational amplifiers 19 and 20, respectively, having respective resistance-type temperature sensing elements 2RT and 3RT connected in a feedback loop of the amplifiers 19 and 20. Circuits 22 and 23 also include input resistances 2RI and 3RI, respectively, connecting inverting inputs 25 and 26 of the corresponding amplifiers 19 and 20 to the reference terminal 13 of the reference source Es, and non-inverting inputs 28 and 29 of the amplifiers 19 and 20 connected to the common terminal 14 of the reference source Es.

Each of the temperature monitoring circuits 21–23 is operable in the manner described above with reference to the monitoring circuit 10 (FIG. 1) to provide an output voltage at a corresponding output 31–33, representing a temperature of interest at the location of the temperature monitoring circuits 21–23. Accordingly, circuit 21 provides an output voltage E1 at output 31, circuit 22 provides an output voltage E2 at output 32, and circuit 23 provides an output voltage E3 at output 33.

The voltage at outputs 31–33 of the temperature monitoring and transmitting circuits 21–23 are multiplexed, using field-effect transistors Q1–Q3 to permit selective transmission via transmission line 36 of the temperature information represented by these outputs to a central processor 35. Suitable field-effect transistors for this purpose are commercially available from Union Carbide Electronics of Mountain View, California as Model No. 2N4392.

Each field-effect transistor, such as field-effect transistor Q1 associated with monitoring circuit 21, has a source lead S connected to the output 31 of the associated circuit 21 and a drain lead D connected over the transmission line 36 to an input of linearizing means 39 at the central processor 35. The gate lead G of the field-effect transistor Q1 is connected to the output of a decoder 41 at the location of the monitoring circuit 21. The input of the decoder 41 is connected over a control conductor 45 to the output of an encoded circuit 44 at the central processor 35.

The field-effect transistor Q1, which is normally cut off, is switched to conduction whenever the decoder 41 is enabled by an enabling signal provided by encoder 44 permitting the output voltage E1 provided at the output 31 of circuit 21 to be extended to the central processor 35.

Similarly, field-effect transistors Q2 and Q3 associated with circuits 22 and 23, respectively, are operable when corresponding decoder circuits 42 and 43 are enabled to extend the respective output voltages E2 and E3 of monitoring circuits 22 and 23 to the central processor 35.

Figure 3:
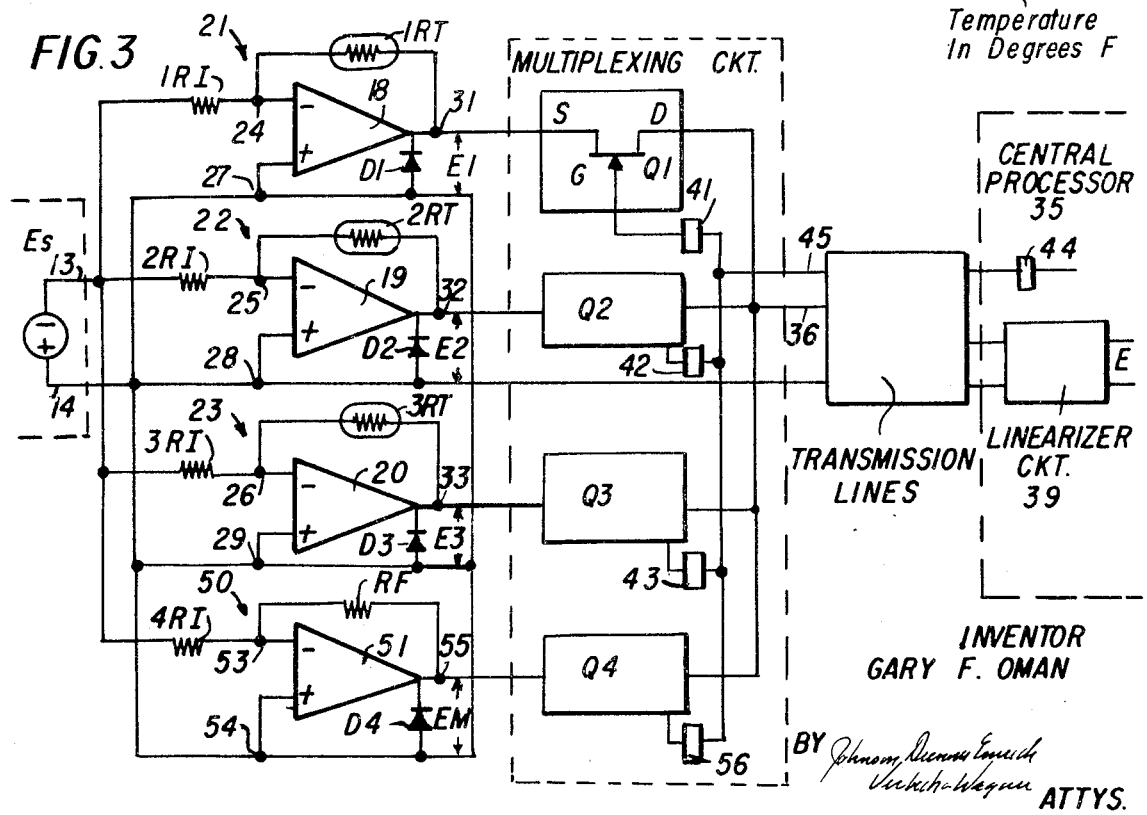
FIG. 3 is a block daigram showing a plurality of the temperature monitoring circuits provided by the present invention wherein the outputs of the circuit are multiplexed into a central processor.

As shown in FIG. 3, diodes D1–D3, such as diode D1 associated with circuit 21, may be connected between the output terminal 31 of circuit 21 and the reference terminal 27 of circuit 21 to prevent negative voltages from adversely affecting the field-effect transistor Q1 associated with temperature monitoring circuit 21.

The encoded circuit 44 at the central processor 35 provides a different select signal for enabling each of the decoder circuits 41–43 to enable the temperature information data provided at the outputs 31–33 of the circuits 21–23 in the form of voltage levels (i.e., E1, E2, E3) to be sequentially gated to the linearizing means 39 at the central processor 35.

The linearizing means 39 linearizes the data provided by each circuit 21–23 to compensate for the non-linear temperature resistance characteristics of the sensing elements 1RT–3RT associated with the temperature monitoring circuits 21–23, respectively. Accordingly, the output voltage EL provided by the linearizing means 39 will be directly proportional to the measurement indicated by the circuits 21–23.

The linearization of the temperature-resistance characteristic may be achieved through the use of software with a table look-up program in the central processor 35. For example, the output of each temperature transmitter circuit, such as output E1 for circuit 21, would be digitized, and the digital value would address a memory location the contents of which would provide the temperature corresponding to the output voltage E1 provided by the temperature monitoring circuit 21 being readout.

In addition to the temperature sensing circuits 21–23, a reference circuit 50 is provided to permit monitoring of the voltage level of the reference source Es. The reference circuit 50 has a fixed resistance Rf connected in a feedback loop of an operational amplifier 51 associated with circuit 50, such fixed resistance Rf replacing the temperature sensing element, such as element 1RT of circuit 21. Amplifier 51 has an inverting input terminal 53 connected over an input resistance 4RI to the reference terminal 13 of the reference source Es, and a non-inverting input terminal 54 connected to the common terminal 14 of the reference source Es. Accordingly, the voltage Em provided at output 55 of reference circuit 50, responsive to current from the source Es conducted over resistor Rf, will be directly proportional to the source voltage Es and, by choosing the value of resistor Rf to be equal to the input resistance 4RI, the output voltage Em will be equal to the amplitude of the source voltage Es.

The output voltage Em provided at terminal 55 of the voltage monitoring circuit 50 is extended over transmission line 36 to the linearizing means 39 at the central processor 35 whenever an associated field-effect transistor Q4 of the multiplexing circuit is enabled responsive to the enabling of an associated decoder circuit 56 by the encoder circuit 44.

The linearizing means 39 may include soft-ware programming for effecting the comparison of the voltage Em provided by the reference voltage monitoring circuit 50 with a desired value for the reference voltage stored in the central processor memory to provide a ratio of the actual reference value of the correct reference value. The outputs of all the temperature circuits 21–23 sharing this reference supply would be multiplied by the inverse of the ratio of the actual reference value to the correct reference value thus correcting for the change in the reference source.

Thus, the reference voltage monitoring circuit 50 permits continuous monitoring of the reference voltage being provided at the remote locations and permits compensation for changes in the reference source output so as to permit correct evaluation and linearization of the output data provided by the temperature monitoring circuits 21–23.

It is pointed out that in installations in which the temperature monitoring circuits 21–23 are remotely located relative to one another, it may be more convenient to provide individual voltage sources, such as source Es, for each of the temperature monitoring circuits 21–23.

I claim:

1. In a data acquisition system, central processing means, a plurality of temperature transmitter circuits at locations of said system remote from said central processing means, each of said temperature transmitter circuits including operational amplifier means having an inverting input, an output, and a non-inverting input, feedback means including temperature sensing means connected between the amplifier inverting input and the amplifier output, said temperature sensing means having a resistance that varies as a function of the temperature at the location of the corresponding temperature transmitter circuit, reference voltage means connected between the amplifier inverting input of at least one of said temperature transmitter circuits and the amplifier non-inverting input of said one temperature transmitter circuit, said reference voltage means supplying a constant reference voltage to the amplifier inputs for providing a constant current through the temperature sensing means of at least said one temperature transmitter circuit whereby the votlage developed across the temperature sensing means of said one temperature transmitter circuit establishes a potential at the amplifier output of said one temperature transmitter circuit relative to the amplifier non-inverting input which varies as a function of the temperature at the location of said one temperature transmitter circuit, reference voltage monitoring means including reference amplifier means having an inverting input, an output, and a noninverting input and fixed resistance means connected between the reference amplifier inverting input and the reference amplifier output, said reference voltage means being connected across the reference amplifier inputs for supplying a constant current to said fixed resistance means whereby said reference amplifier means provides a potential at the reference amplifier output relative to the reference amplifier non-inverting input that is proportional to the voltage provided by said reference voltage means, and multiplexing means including individual switching means for each of said temperature transmitter circuits each operable when enabled to extend the potential provided at the amplifier output of an associated one of said temperature transmitting circuits to said central processing means and further switching means operable when enabled to extend the output potential of said reference amplifier means to said central processing means, said central processing means including select means for selectively enabling the switching means associated with said temperature transmitter circuits and said reference voltage monitoring means.

2. A data acquision circuit as set forth in claim 1 wherein said central processing means includes means for adjusting the value of the potentials extended to said central processing means from said temperature transmitter circuits to compensate for changes in the reference voltage as indicated by the output potential provided by said reference voltage monitoring means.

3. In a data acquisition system, central processing means, at least one temperature monitoring means at a location of said system that is remote from said central processing means, said temperature monitoring means including temperature sensing means having a resistance that varies as a function of the temperature at the location of said temperature monitoring circuit, reference voltage means for supplying a reference voltage of a predetermined amplitude to inputs of said temperature monitoring means whereby said temperature monitoring means provides an output voltage that is proportional to the product of the amplitude of said reference votlage and the resistance of said temperature sensing means, reference source monitoring means, said reference source further supplying said reference voltage to inputs of said reference source monitoring means whereby said reference source monitoring means provides an output voltage that is proportional to the amplitude of said reference voltage, and multiplexing means including first switching means associated with said temperature monitoring means and operable when enabled to extend the output voltage provided by said temperature monitoring means to said central processing means and second switching means associated with said reference voltage monitoring means and operable when enabled to extend the output voltage provided by said reference source monitoring means to said central processing means, said central processing means including select means for selectively enabling said first and second switch means, and means for adjusting the value of the output voltage extended to said central processing means from said temperature monitoring means to compensate for changes in the reference voltage as indicated by the output voltage extended to said central processing means by said reference source monitoring means.

\* \* \* \* \*